US012285960B2

(12) United States Patent
Asano et al.

(10) Patent No.: US 12,285,960 B2
(45) Date of Patent: Apr. 29, 2025

(54) PRINTING DEVICE CONFIGURED TO DISCHARGE PRINTING TAPE WITH PRINTED SURFACE THEREOF VISIBLE TO USER

(71) Applicant: BROTHER KOGYO KABUSHIKI KAISHA, Nagoya (JP)

(72) Inventors: Masahide Asano, Nagoya (JP); Takahiro Ogawa, Nagoya (JP); Shinji Ukai, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 182 days.

(21) Appl. No.: 18/149,918

(22) Filed: Jan. 4, 2023

(65) Prior Publication Data

US 2023/0234387 A1 Jul. 27, 2023

(30) Foreign Application Priority Data

Jan. 21, 2022 (JP) ................................ 2022-007974
Jan. 21, 2022 (JP) ................................ 2022-007975

(51) Int. Cl.

| | |
|---|---|
| ***B41J 32/02*** | (2006.01) |
| ***B41J 2/32*** | (2006.01) |
| ***B41J 3/407*** | (2006.01) |
| ***B41J 11/04*** | (2006.01) |
| ***B41J 11/14*** | (2006.01) |
| ***B41J 11/70*** | (2006.01) |
| ***B41J 15/04*** | (2006.01) |

(Continued)

(52) U.S. Cl.

CPC ................ *B41J 32/02* (2013.01); *B41J 2/32* (2013.01); *B41J 3/4075* (2013.01); *B41J 11/04* (2013.01); *B41J 11/14* (2013.01); *B41J 11/703* (2013.01); *B41J 15/044* (2013.01); *B41J 29/13* (2013.01); *B41J 35/28* (2013.01)

(58) Field of Classification Search

CPC ... B41J 32/02; B41J 11/04; B41J 11/14; B41J 11/703; B41J 29/13; B41J 35/28; B41J 2/32; B41J 3/4075; B41J 15/044

See application file for complete search history.

(56) References Cited

FOREIGN PATENT DOCUMENTS

| | | | | |
|---|---|---|---|---|
| JP | 2012-508126 A | 4/2012 | | |
| JP | WO2020202919 * | 10/2020 | ................ | B41J 2/01 |
| WO | 2010/054179 A1 | 5/2010 | | |

* cited by examiner

*Primary Examiner* — Henok D Legesse
(74) *Attorney, Agent, or Firm* — KENEALY VAIDYA LLP

(57) ABSTRACT

A printing device includes a housing, a printing head, and an input unit. The housing includes a cassette accommodating portion to which a tape cassette accommodating a roll of a printing tape is detachably attachable. The cassette accommodating portion has an insertion opening through which the tape cassette can be inserted in an insertion direction. The printing head includes heat-generating elements arrayed in a scanning direction crossing an imaginary plane perpendicular to the insertion direction. The housing has: a principal surface at which the input unit is provided; a side surface crossing the principal surface and the imaginary plane; and a discharge opening formed in the side surface. The insertion opening is positioned above the input unit. At the discharge opening, a normal direction of a printed surface of the printing tape and a normal direction of the principal surface define an interior angle of less than 45 degrees therebetween.

21 Claims, 10 Drawing Sheets

(51) Int. Cl.
*B41J 29/13* (2006.01)
*B41J 35/28* (2006.01)

PRINTING DEVICE CONFIGURED TO DISCHARGE PRINTING TAPE WITH PRINTED SURFACE THEREOF VISIBLE TO USER

REFERENCE TO RELATED APPLICATIONS

This application claims priorities from Japanese Patent Application Nos. 2022-007974 filed on Jan. 21, 2022 and 2022-007975 filed on Jan. 21, 2022. The entire contents of the priority applications are incorporated herein by reference.

BACKGROUND ART

In a printing device configured to perform printing on a printing tape, a tape cassette accommodating the printing tape is configured to be attached to or detached from a printer body of the printing device to replace the printing tape with a new tape and to supply the new tape to the printer body. A tape cassette configured to be inserted in an opening of a housing of the printer body is known in the art.

DESCRIPTION

In the conventional printing device described above, the housing has a principal surface at which an input unit is provided. The printing tape is configured to be discharged from the housing such that the printed surface of the printing tape is slanted to face downward with respect to the principal surface. Hence, it is rather difficult for a user to recognize the printing result appearing on the printing tape.

It is therefore an object of the disclosure to provide a printing device capable of facilitating user's confirmation of the printing result appearing on the printing tape.

Further, in the conventional printing device described above, dust is likely to be entered in the interior of the opening when the cassette is not attached to the opening. Hence, dust may be deposited on a printing head positioned inside the opening, which may cause failure of printing.

In view of the foregoing, it is another object of the present disclosure to provide a printing device having a housing from which a tape cassette attached thereto is exposed and capable of restraining malfunction of a printing head.

In order to attain the above and other objects, the present disclosure provides a printing device including a housing, a printing head, and an input unit. The housing includes a cassette accommodating portion to which a tape cassette is detachably attachable. The cassette accommodating portion has an insertion opening through which the tape cassette is configured to be inserted into the cassette accommodating portion in an insertion direction. The tape cassette accommodates therein a roll of a printing tape. The printing head is positioned in the cassette accommodating portion and is configured to perform printing on a first surface of the printing tape. The printing head includes a plurality of heat-generating elements linearly arrayed in a scanning direction crossing an imaginary plane perpendicular to the insertion direction. The input unit is provided at the housing. The insertion opening is positioned above the input unit in a state where the input unit can be operated. The housing has: a principal surface at which the input unit is provided; a side surface crossing the principal surface and the imaginary plane; and a discharge opening formed in the side surface and configured to discharge the printing tape therethrough. At the discharge opening, a normal direction of the first surface of the printing tape and a normal direction of the principal surface define an interior angle of less than 45 degrees therebetween.

With this structure, a user can simultaneously visually recognize not only the printed surface of the printing tape discharged through the discharge opening but also the principal surface at which the input unit is provided. Hence, the user can easily confirm the printing result appearing on the printing tape.

According to another aspect, the present disclosure provides a printing device including a housing, a printing head, and an input unit. The housing includes a cassette accommodating portion to which a tape cassette is detachably attachable. The tape cassette is configured to be inserted into the cassette accommodating portion in an insertion direction. The tape cassette accommodates therein a roll of a printing tape and has an outer surface crossing a center axis of the roll of the printing tape. The printing head is positioned in the cassette accommodating portion and is configured to perform printing on the printing tape. The printing head includes a plurality of heat-generating elements linearly arrayed in a scanning direction crossing an imaginary plane perpendicular to the insertion direction, the plurality of heat-generating elements constituting a printing surface of the printing head. The input unit is provided at the housing. The housing is configured to expose the outer surface of the tape cassette to an outside of the housing upon attachment of the tape cassette to the cassette accommodating portion. The printing surface of the printing head faces downward in a state where the housing is placed on a surface such that the input unit faces upward.

With this structure, in the state where the printing device is placed such that the input unit faces upward, the printing surface of the printing head faces downward so that deposition of dust at the printing head disposed in the cassette accommodating portion can be restrained. Accordingly, malfunction in the printing head is less likely to occur in this printing device having a housing to which a tape cassette is attached with a part of the tape cassette exposed therefrom.

According to still another aspect, the disclosure also provides a printing device including a housing, a printing head, and an input unit. The housing includes a cassette accommodating portion to which a tape cassette is detachably attachable in an insertion direction. The tape cassette accommodates therein a roll of a printing tape and has an outer surface crossing a center axis of the roll of the printing tape. The printing head is positioned in the cassette accommodating portion and is configured to perform printing on the printing tape. The printing head includes a plurality of heat-generating elements linearly arrayed in a scanning direction crossing an imaginary plane perpendicular to the insertion direction. The input unit is provided at a principal surface of the housing. The principal surface and the imaginary plane define therebetween an external angle of not less than 270 degrees at an outside of the housing.

With this structure, entry of dust into the cassette accommodating portion can be restrained since the imaginary plane (on which a part of the tape cassette attached to the cassette accommodating portion is exposed) is set to be inclined relative to the principal surface by the angle not less than 270 degrees. As a result, malfunction in the printing head is less likely to occur in the printing device having a housing to which a tape cassette is attached with a part of the tape cassette exposed therefrom.

1. FIRST EMBODIMENT

1-1. Structure

Figure 1:
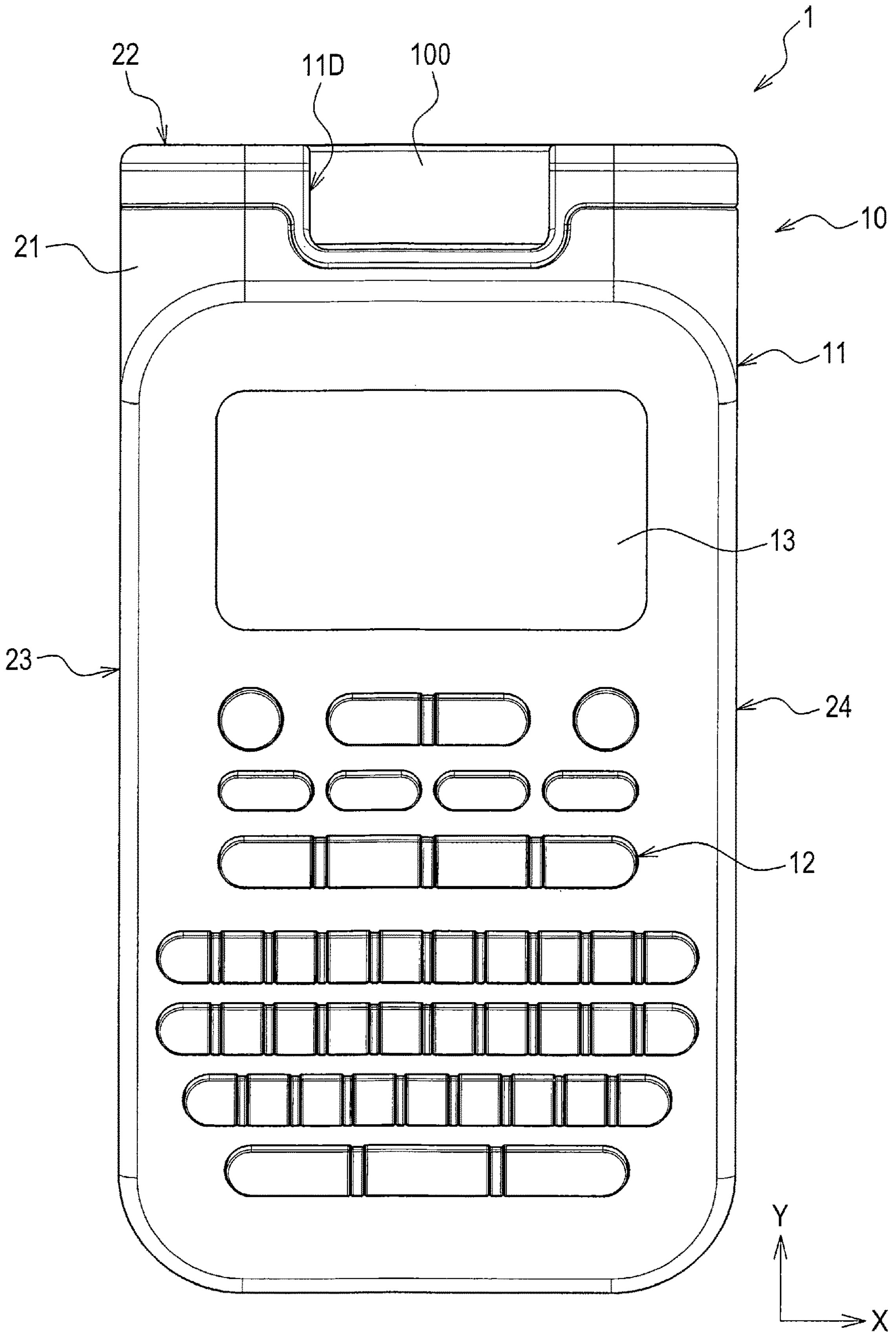
FIG. 1 is a schematic plan view of a printing device according to a first embodiment.

A printing device 1 according to a first embodiment will be described with reference to FIGS. 1 through 6. The printing device 1 is configured to perform printing on a tape-like printing medium. The printing device 1 includes a printer body 10 to which a tape cassette 100 is attachable.

<Printer Body>

The printer body 10 includes a housing 11, an input unit 12, and a display 13. The housing 11 has a principal surface 21 on which the input unit 12 and the display 13 are provided.

In the following description, an axis parallel to a left-right direction of the principal surface 21 (i.e., a widthwise direction of the principal surface 21) will be referred to as an "X axis", an axis parallel to an up-down direction of the principal surface 21 (i.e., the axis parallel to the principal surface 21 and perpendicular to the X-axis) will be referred to as a "Y axis", and an axis parallel to the normal direction of the principal surface 21 will be referred to as a "Z axis".

Figure 3A:
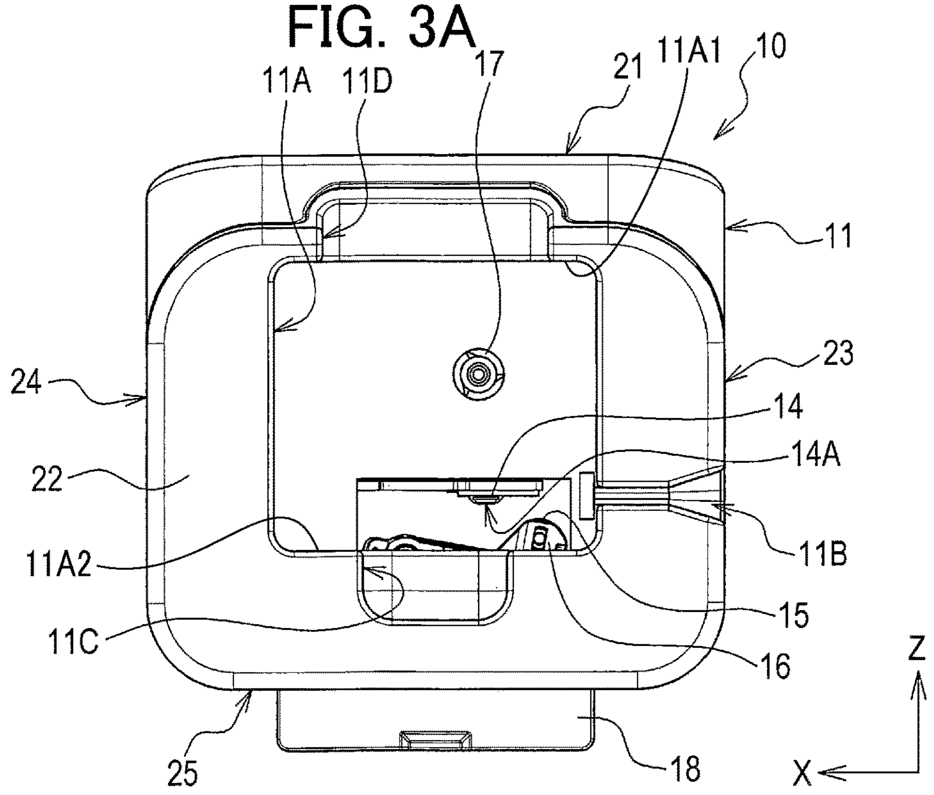
FIG. 3A is a schematic top view of the printing device illustrated in FIG. 1 and illustrating a state where the tape cassette is detached from the cassette accommodating portion.
Figure 3B:
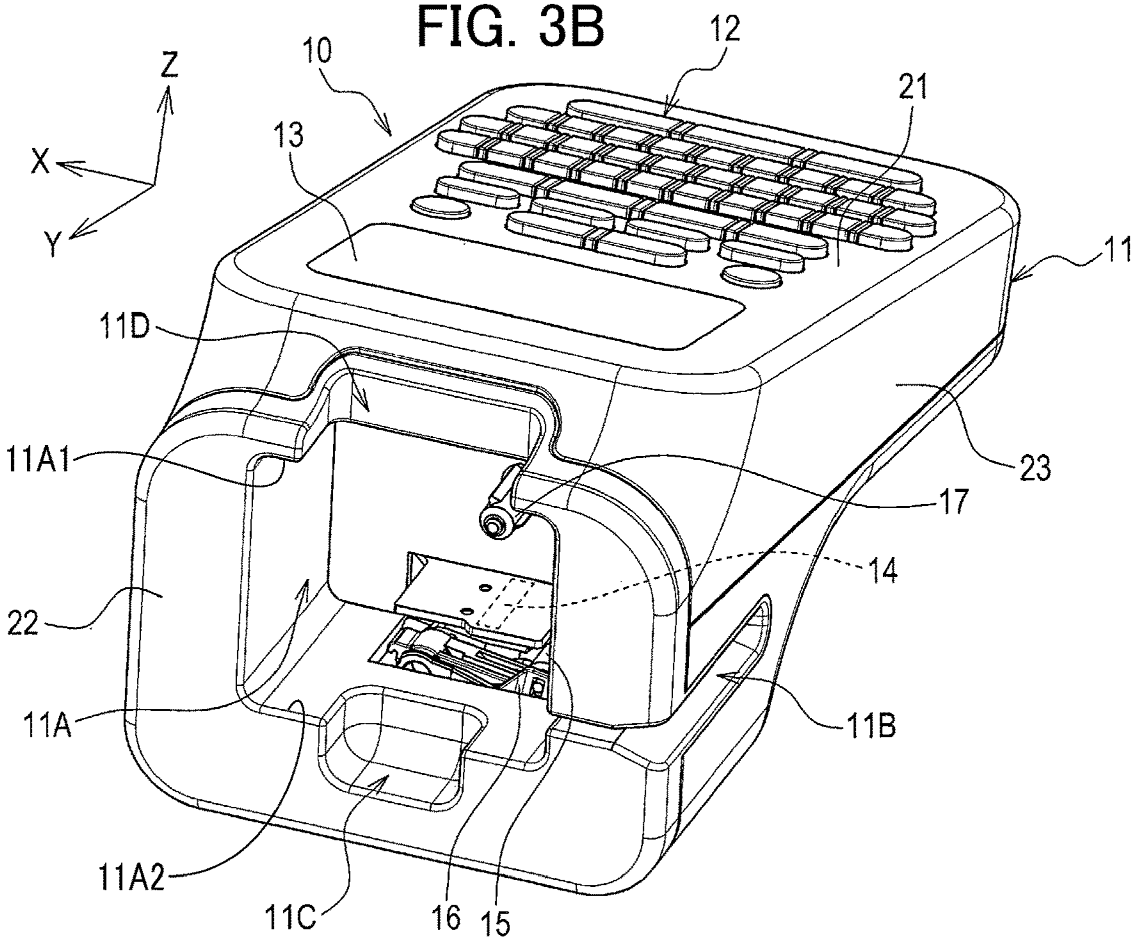
FIG. 3B is a schematic perspective view of the printing device illustrated in FIG. 3A.

Further, as illustrated in FIGS. 3A and 3B, the printer body 10 includes a printing head 14, a platen roller 15, a roller holder 16, a drive shaft 17, and a lever 18.

Housing

Figure 2:
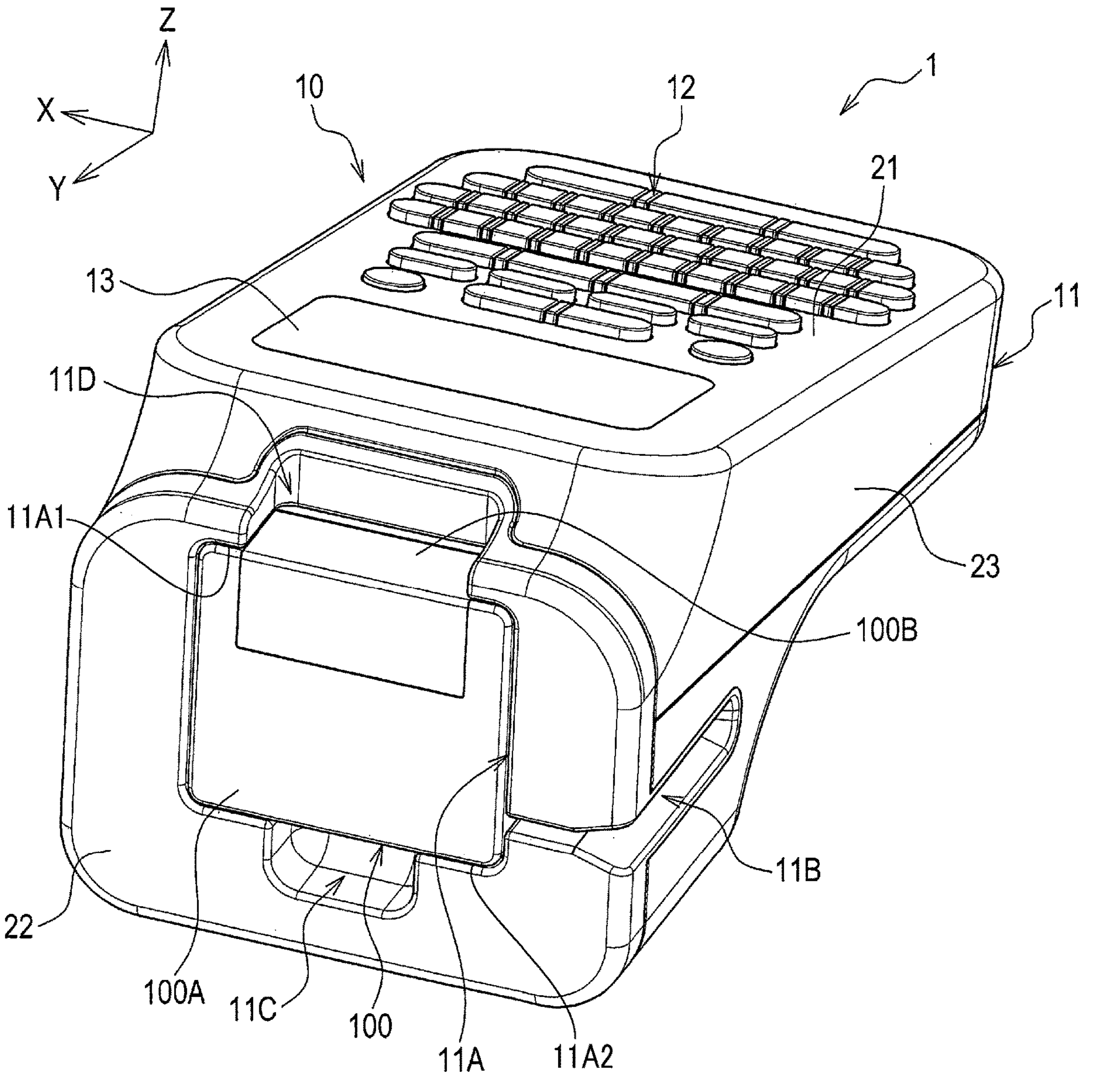
FIG. 2 is a schematic perspective view of the printing device illustrated in FIG. 1 in a state where a tape cassette is attached to a cassette accommodating portion of the printing device.

As illustrated in FIG. 2, the housing 11 has a cassette accommodating portion 11A, a discharge opening 11B, and a finger hooking part 11C.

Cassette Accommodating Portion

The cassette accommodating portion 11A defines a space for accommodating therein the tape cassette 100. The cassette accommodating portion 11A has an insertion opening formed in an upper surface 22 of the housing 11. The tape cassette 100 can be inserted in the cassette accommodating portion 11A in an insertion direction D1 perpendicular to the upper surface 22, i.e., in the normal direction of the upper surface 22 (see FIGS. 5 and 6).

The insertion direction D1 of the tape cassette 100 into the cassette accommodating portion 11A crosses the principal surface 21 where the input unit 12 and the display 13 are provided. The insertion opening of the cassette accommodating portion 11A is positioned above the input unit 12 and the display 13 in a state where the printer body 10 is in such a posture that the input unit 12 can be operated by the user. The upper surface 22, which defines the insertion opening of the cassette accommodating portion 11A, constitutes an upper end of the housing 11. The upper surface 22 extends in a direction crossing the Y axis and the Z axis (see FIG. 5).

As illustrated in FIG. 2, in the state where the tape cassette 100 is accommodated in the cassette accommodating portion 11A, an outer surface 100A of the tape cassette 100 is exposed to the outside through insertion opening of the cassette accommodating portion 11A. The outer surface 100A is a surface crossing a center axis P (see FIG. 6) of a first roll 101 (see FIG. 6) housed in the tape cassette 100. The center axis P is parallel to the insertion direction D1 of the tape cassette 100 relative to the cassette accommodating portion 11A.

In the present embodiment, the housing 11 does not include a lid for covering the tape cassette 100 accommodated in the cassette accommodating portion 11A. The tape cassette 100 attached to the cassette accommodating portion 11A is configured to be engaged with the housing 11 by way of operation of the lever 18 (see FIGS. 4A and 4B).

The cassette accommodating portion 11A has an opening part 11D through which a part of the tape cassette 100 attached to the cassette accommodating portion 11A is exposed when viewed in the normal direction of the principal surface 21. The opening part 11D is opened to the insertion opening of the cassette accommodating portion 11A.

Specifically, the cassette accommodating portion 11A has a generally rectangular shape having a first side edge 11A1 and a second side edge 11A2 extending in parallel to the X-axis and opposing each other. The first side edge 11A1 is positioned closer to the principal surface 21 than the second side edge 11A2 is to the principal surface 21. The opening part 11D is provided in a form of a recess that is recessed downward toward the input unit 12 from the first side edge 11A1. In other words, the upper surface 22 has a stepped portion stepped downward to provide the opening part 11D.

A label 100B is stuck to an outer surface of the tape cassette 100, the outer surface crossing the outer surface 100A and extending in parallel to the center axis P of the first roll 101 housed in the tape cassette 100. As illustrated in FIG. 2, the label 100B of the tape cassette 100 attached to the cassette accommodating portion 11A can be exposed through the opening part 11D, so that a user can confirm the label 100B of the attached tape cassette 100 when the user operates the input unit 12. In this way, the tape cassette 100 attached to the cassette accommodating portion 11A can be easily identified by the user.

Discharge Opening

The discharge opening 11B is configured to discharge a printing tape from the cassette accommodating portion 11A to the outside of the housing 11. The discharge opening 11B is formed in a first side surface 23 of the housing 11 (see FIG. 2). The printing tape is configured to be discharged through the discharge opening 11B in a direction parallel to the X-axis, i.e., in a direction perpendicular to the first side surface 23.

The first side surface 23 extends to cross the principal surface 21 as well as the upper surface 22. That is, the first side surface 23 crosses an imaginary plane perpendicular to the insertion direction D1 of the tape cassette 100 to the cassette accommodating portion 11A. The first side surface 23 is positioned leftward of the principal surface 21 in the state where the printing device 1 (printer body 10) is in such a posture that the user can operate the input unit 12. Incidentally, the housing 11 also has a second side surface 24 (see FIGS. 3A, 4A) opposite the first side surface 23. No opening is formed in the second side surface 24.

Figure 5:
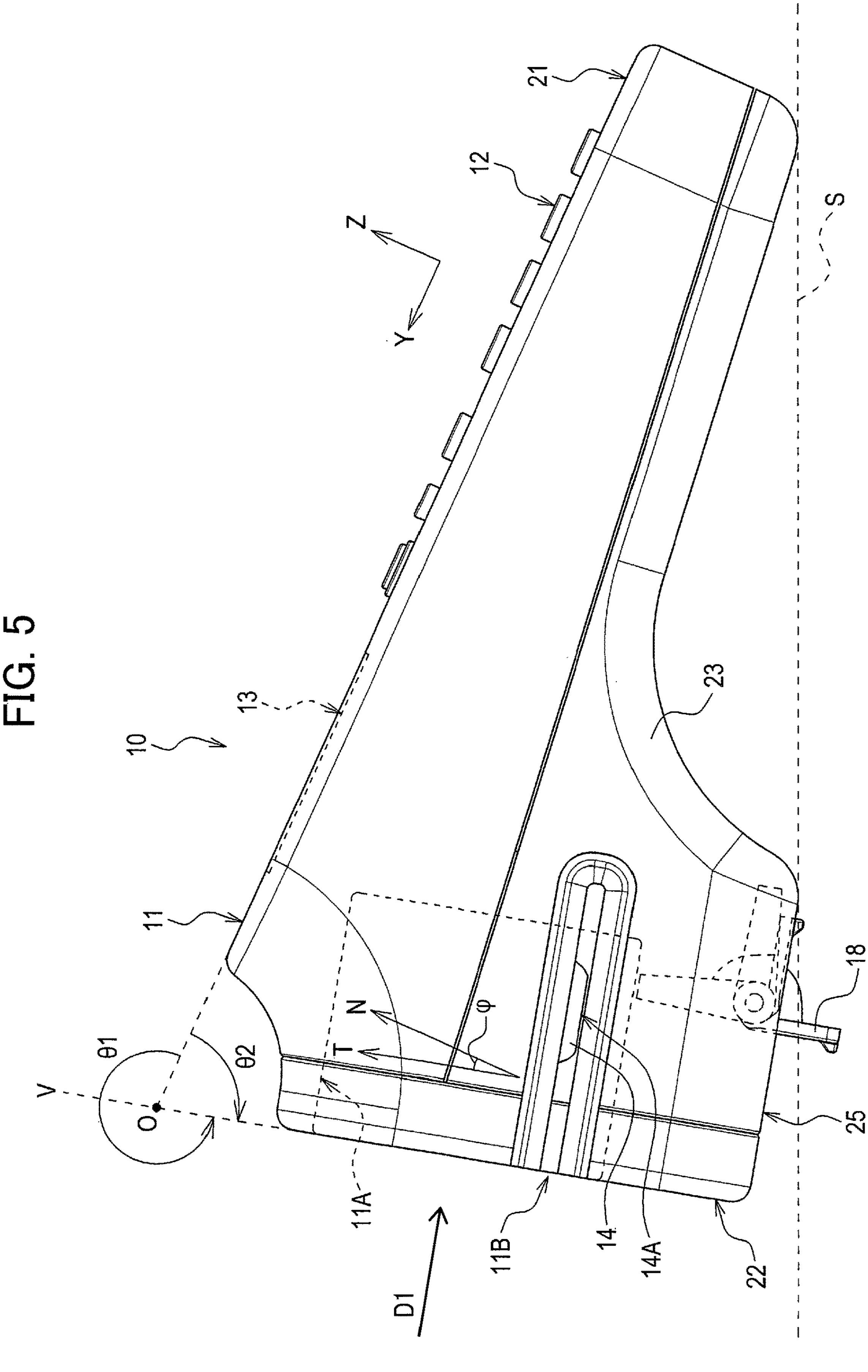
FIG. 5 is a schematic side view of the printing device illustrated in FIG. 3 in a state where the printing device is placed on a flat surface.

As illustrated in FIG. 5, at the discharge opening 11B, an angle (interior angle) φ of less than 45 degrees is defined between a normal direction T and a normal direction N. Here, the normal direction T is normal to a printed surface of the printing tape to be printed by the printing head 14, that is, the normal direction of the surface of the printing tape facing the printing head 14. The normal direction N is normal to the principal surface 21, i.e., in parallel to the Z-axis.

That is, in a state where the housing 11 is seated on a flat surface S such that the input unit 12 faces upward, the printing tape is discharged through the discharge opening 11B with the printed surface of the printing tape facing upward, i.e., toward the input unit 12.

Finger Hooking Part

Figure 4A:
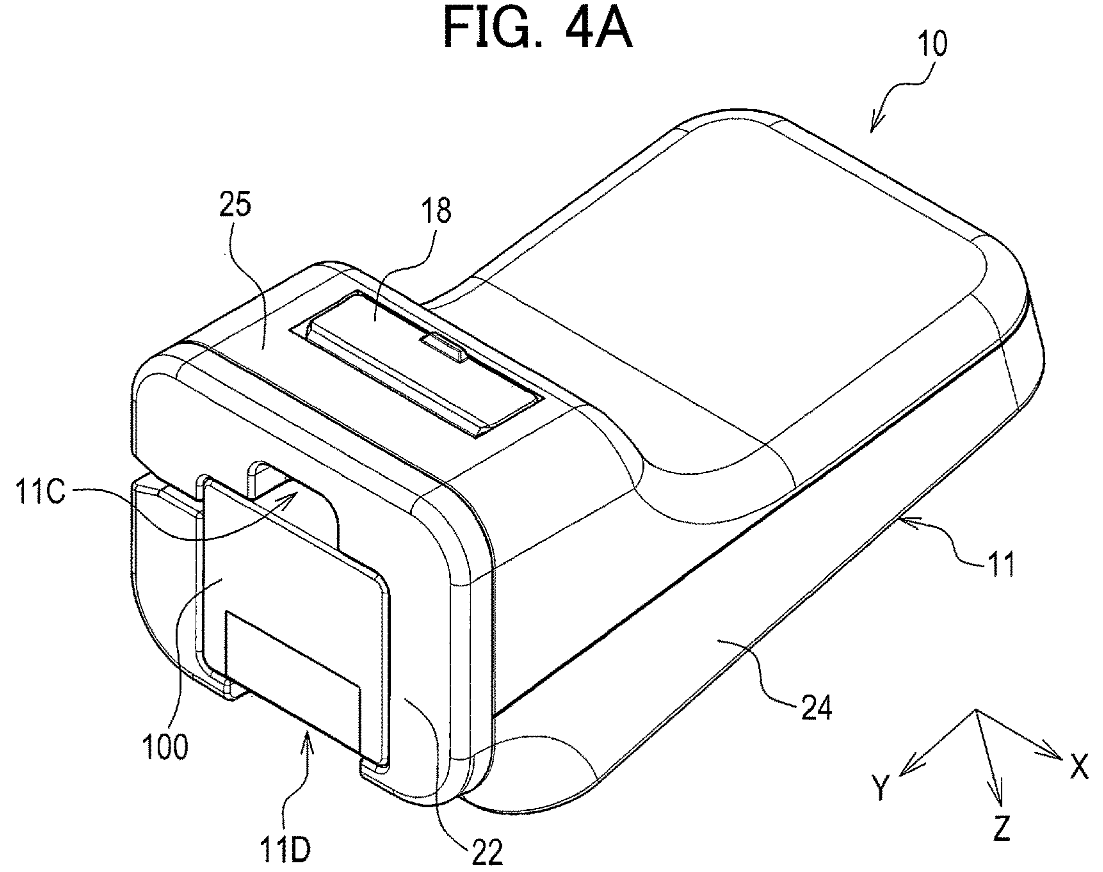
FIG. 4A is another schematic perspective view of the printing device illustrated in FIG. 1 in the state where the tape cassette is attached to the cassette accommodating portion.
Figure 4B:
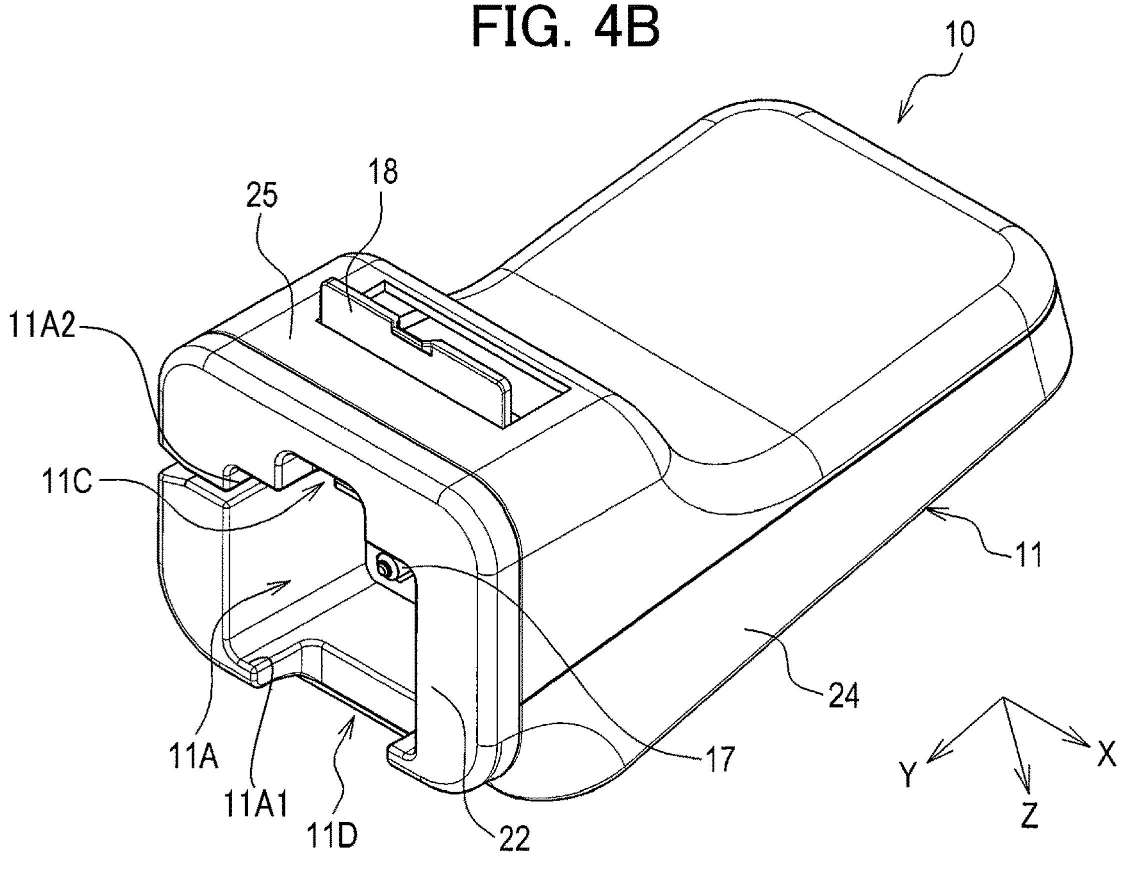
FIG. 4B is another schematic perspective view of the printing device illustrated in FIG. 3A.

The finger hooking part 11C illustrated in FIGS. 4A and 4B is a recessed part connected to the cassette accommodating portion 11A.

Specifically, in the upper surface 22, the finger hooking part 11C is positioned on the second side edge 11A2 and is positioned opposite the opening part 11D with respect to the cassette accommodating portion 11A. In the attached state of the tape cassette 100 to the cassette accommodating portion 11A, a part of the tape cassette 100 is exposed to the finger hooking part 11C, as illustrated in FIG. 4A.

In the attached state of the tape cassette 100 to the cassette accommodating portion 11A, the tape cassette 100 can be taken out of the cassette accommodating portion 11A by the insertion of the user's finger into the finger hooking part 11C.

Input Unit

The input unit 12 illustrated in FIG. 1 is a keyboard configured to input letters, symbols, marks and the like to be printed on the printing tape. The input unit 12 includes a plurality of keys or buttons arranged on the principal surface 21 of the housing 11. The input unit 12 also includes operation keys for inputting print settings and commands to execute printing operations.

The principal surface 21 is a surface on which the user's inputting operations and display confirmation are intensively performed in an operating state of the printing device 1 (the printer body 10). The user performs inputting operations in a state where the printing device 1 (printer body 10) is placed on a flat surface or gripped by the user with the input unit 12 and display 13 visible to the user. The principal surface 21 has a length in the up-down direction (i.e., the length in the Y axis) greater than a length in the left-right direction (i.e., the length in the X-axis) in the state where the input unit 12 can be operated.

Display

The display 13 is configured to display contents (printing contents) inputted by the input unit 12. The display 13 may be configured by a liquid crystal display (LCD) and an organic LED, for example.

The display 13 is positioned on the principal surface 21 of the housing 11. The display 13 is positioned closer to the insertion opening of the cassette accommodating portion 11A (i.e., to the upper surface 22) than the input unit 12 is to the insertion opening. That is, the display 13 is positioned above the input unit 12 and below the insertion opening of the cassette accommodating portion 11A in the state where the input unit 12 can be operated.

As illustrated in FIG. 5, the cassette accommodating portion 11A is overlapped with a part of the display 13 in the normal direction N of the principal surface 21 (i.e., in the direction of the Z-axis).

Printing Head

The printing head 14 illustrated in FIGS. 3A and 3B is configured to perform printing on the printing tape of the tape cassette 100. The printing head 14 is positioned in the cassette accommodating portion 11A. The printing head 14 has a plate-like shape and is arranged such that a thickness direction of the printing head 14 is in parallel to a thickness direction of the printing tape which is being discharged through the discharge opening 11B.

The printing head 14 includes a plurality of heat-generating elements each of whose heat generation is individually controlled. When the printing tape is conveyed by the platen roller 15 to a position overlapping with the printing head 14, the printing tape is pressed against the printing head 14 through an ink ribbon with heat, so that a heated part of the ink on the ink ribbon corresponding to the heated heat-generating elements is transferred onto the printing tape. Letters, symbols, marks and the like are therefore printed on the printing tape.

The plurality of heat-generating elements constitutes a printing surface 14A of the printing head 14. Further, the heat-generating elements are arrayed with one another in a scanning direction. Here, the scanning direction is a direction crossing an imaginary plane V (see FIG. 5) which is perpendicular to the insertion direction D1 of the tape cassette 100 to the cassette accommodating portion 11A. That is, the imaginary plane V is a plane parallel to the upper surface 22. In the present embodiment, the scanning direction is parallel to the insertion direction D1 of the tape cassette 100.

As illustrated in FIG. 5, the printing surface 14A of the printing head 14 is arranged to face downward in the state where the housing 11 is placed on the flat surface S such that the input unit 12 and the display 13 face upward.

Here, "the printing surface 14A faces downward" implies that a normal vector of the printing surface 14A contains a vertically downward component. That is, the printing head 14 is pressed against the printing tape from above.

Incidentally, in the state where the housing 11 is seated on the flat surface S such that the input unit 12 and the display 13 face upward, a normal vector of the principal surface 21 and a normal vector of the upper surface 22 are both inclined with respect to the vertical direction and contain vertically upward components.

Further, the principal surface 21 and the imaginary plane V (the upper surface 22) define a first angle θ1 (external angle) therebetween at the outside of the housing 11, the first angle θ1 being not less than 270 degrees. In other words, the first angle θ1 of not less than 270 degrees is defined as an external angle between the principal surface 21 and the imaginary plane V which is perpendicular to the insertion direction D1 of the tape cassette 100 into the cassette accommodating portion 11A. In other words, the principal surface 21 and the imaginary plane V define therebetween a second angle θ2 (interior angle) at an inner side of the housing 11, the second angle θ2 being less than 90 degrees.

Here, assume a Y-Z coordinate in which an intersection between the imaginary plane V and an extension plane extending from the principal surface 21 is defined as an origin O. In the Y-Z coordinate having first through fourth quadrants, the first angle θ1 is measured from the principal surface 21 to the imaginary plane V in a counterclockwise direction in a case where the principal surface 21 defines the boundary between the first quadrant and the fourth quadrant and the normal vector of the principal surface 21 faces toward the first quadrant.

Platen Roller

The platen roller 15 illustrated in FIGS. 3A and 3B is configured to convey the printing tape from the interior to the exterior of the tape cassette 100. The platen roller 15 has a rotation axis parallel to the insertion direction D1 of the tape cassette 100 to the cassette accommodating portion 11A. That is, the rotation axis of the platen roller 15 is also parallel to the scanning direction of the printing head 14.

The platen roller 15 is positioned to face the printing head 14 inside the housing 11. The platen roller 15 is held by the roller holder 16. In accordance with movement of the roller holder 16, the platen roller 15 is movable between a nipping position (where the printing tape is nipped between the printing head 14 and the platen roller 15) and a non-nipping position (where the platen roller 15 is separated from the printing tape). In the nipping position, the platen roller 15 urges the printing tape toward the printing head 14.

Drive Shaft

The drive shaft 17 is positioned in the housing 11. The drive shaft 17 is inserted in the tape cassette 100 within the cassette accommodating portion 11A when the tape cassette 100 is attached to the cassette accommodating portion 11A.

The drive shaft 17 is configured to input a driving force to the tape cassette 100 for taking up the ink ribbon inside the tape cassette 100. The drive shaft 17 has a rotation axis extending parallel to the Y-axis. The drive shaft 17 is rotatable about the rotation axis by a driving source (not illustrated).

Lever

The lever 18 illustrated in FIGS. 4A and 4B is a plate-like member configured to displace the platen roller 15 between the nipping position and the non-nipping position. The lever 18 is connected to the roller holder 16 at the interior of the housing 11.

The lever 18 is provided at a rear surface 25 of the housing 11. The rear surface 25 is positioned opposite to the principal surface 21 with respect to the printing head 14 and the platen roller 15. The rear surface 25 is inclined relative to the principal surface 21 (see FIG. 5). Further, the rear surface 25 is perpendicular to the upper surface 22.

The lever 18 is displaceable between a locking position illustrated in FIG. 4A and an unlocking position illustrated in FIG. 4B. The lever 18 is connected to the housing 11 such that the lever 18 is pivotally movable relative to the housing 11 about a pivot axis extending in parallel to the rear surface 25.

When the lever 18 is at the locking position, the lever 18 is accommodated in the housing 11 such that the lever 18 is flush with the rear surface 25. The platen roller 15 is moved to the nipping position and the tape cassette 100 is fixed to the housing 11 as a result of displacement of the lever 18 to the locking position.

When the lever is at the unlocking position, the lever 18 is in an upright posture relative to the rear surface 25. The platen roller 15 is moved to the non-nipping position and the tape cassette 100 is released from the housing 11 as a result of displacement of the lever 18 to the unlocking position.

<Tape Cassette>

The tape cassette 100 accommodates therein the printing tape as a printing medium.

The tape cassette 100 is attachable to and detachable from the printer body 10. By replacing the tape cassette 100 with a new tape cassette 100, a new printing tape can be supplied and/or the kind of the printing tape (color, material, and the like, for example) can be changed with a desired one.

Figure 6:
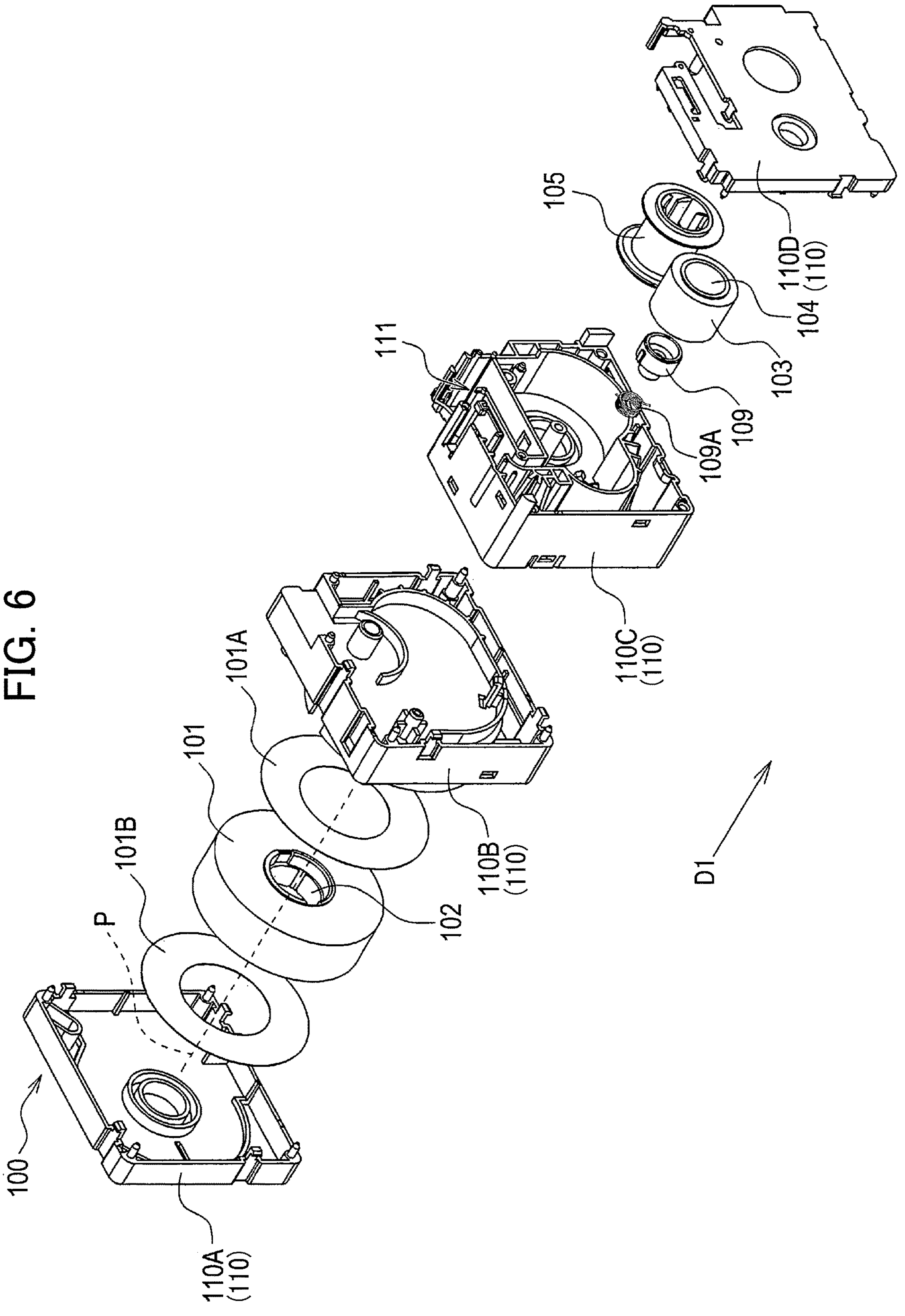
FIG. 6 is an exploded perspective view of a tape cassette to be used in the printing device illustrated in FIG. 1.

As illustrated in FIG. 6, the tape cassette 100 includes the first roll 101, a first feed spool 102, a second roll 103, a second feed spool 104, a take-up spool 105, a clutch spring holder 109, and a casing 110 including a first case 110A, a second case 110B, a third case 110C, and a fourth case 110D.

Casing

The case 110 is provided by a combination of the first case 110A, the second case 110B, the third case 110C, and the fourth case 110D for accommodating therein the above-mentioned tape rolls and spools, and a gear (not illustrated).

The case 110 of the tape cassette 100 has a rectangular parallelepiped shape having a first pair of sides extending parallel to each other in the up-down direction, a second pair of sides extending parallel to each other in the front-rear direction, and a third pair of sides extending parallel to each other in the left-right direction. The first case 110A includes an outer wall facing the first roll 101 and having the outer surface 100A (see FIG. 2) that crosses the center axis P.

The third case 110C has a head opening 111 in which the printing head 14 is inserted when the tape cassette 100 is attached to the cassette accommodating portion 11A. Printing on the printing tape by the printing head 14 is performed in the head opening 111.

In the head opening 111, the printing tape defines a widthwise direction that is parallel to the scanning direction of the printing head 14 (i.e., the direction of the array of the heat generating elements of the printing head 14). The printing tape printed at the head opening 111 is discharged through the discharge opening 11B of the housing 11.

First Roll

The first roll 101 is a roll of the printing tape wound over the first feed spool 102. The surface of the printing tape is subjected to printing through the ink ribbon by the printing head 14 of the printer body 10. Spacer films 101A and 101B are provided at outer surfaces of the first roll 101 in an axial direction thereof such that the first roll 101 is interposed between the spacer films 101A and 101B in the axial direction (i.e., in the direction of the center axis P).

The center axis P of the first roll 101 is parallel to the insertion direction D1 of the tape cassette 100 to the cassette accommodating portion 11A. Further, the first roll 101 is positioned offset from the head opening 111 in the insertion direction D1.

Hence, the plurality of heat-generating elements of the printing head 14 is positioned offset from the first roll 101 in the scanning direction (i.e., in the insertion direction DO in the attached state of the tape cassette 100 to the cassette accommodating portion 11A.

First Feed Spool

The first feed spool 102 is rotatable about the rotation axis (center axis P) of the first roll 101. The first feed spool 102 is rotatably supported by the first case 110A and the third case 110C. The first feed spool 102 is rotatable following the rotation of the platen roller 15 provided in the printer body 10 to convey the printing tape to the printing head 14.

Second Roll

The second roll 103 is a roll of the ink ribbon wound over the second feed spool 104 for use in printing on the printing tape. The second roll 103 is positioned offset from the first roll 101 in the insertion direction D1. The second roll 103 is rotatably supported by the third case 110C and the fourth case 110D.

The ink ribbon is configured to be superposed with the printing tape for printing on the printing tape by the printing head 14. The ink ribbon used for printing is taken up by the take-up spool 105 and wound over the take-up spool 105. On the second roll 103, rotational resistance is imparted by a clutch spring 109A which is held by the clutch spring holder 109.

Second Feed Spool

The second feed spool 104 is rotatable about its rotation axis. The second feed spool 104 is rotatable following the rotation of the take-up spool 105 to supply the ink ribbon to the printing head 14. The second feed spool 104 is disposed over the clutch spring holder 109 that is supported by the third case 110C.

Take-Up Spool

The take-up spool 105 is rotatable about its rotation axis. The take-up spool 105 is rotatably supported by the third case 110C and the fourth case 110D. The driving force from the drive shaft 17 of the printer body 10 is configured to be transmitted to the take-up spool 105.

1-2. How to Use the Printing Device

Hereinafter, a procedure to perform printing on the printing tape in the printing device 1 will be described.

Firstly, the user inserts the tape cassette 100 into the cassette accommodating portion 11A of the printer body 10.

Upon insertion of the tape cassette 100, the user moves the lever 18 from the unlocking position (FIG. 4B) to the locking position (FIG. 4A). The platen roller 15 is thus moved to the nipping position to enable the printer body 10 to perform printing.

In the state where the printer body 10 is ready to perform printing, those letters, symbols and marks inputted through the input unit 12 by the user are displayed on the display 13. After confirming the inputted content through the display 13, the user inputs a print command through the input unit 12. As a result, printing is performed on the printing tape of the tape cassette 100 by the printing head 14.

After printing is performed on the printing tape by the printing head 14, the printing tape is discharged through the discharge opening 11B. At this time, the printing tape is discharged out of the housing 11 such that the printed surface of the printing tape faces the user.

For replacing the tape cassette 100 with a new tape cassette 100, the user moves the lever 18 from the locking position (FIG. 4A) to the unlocking position (FIG. 4B) to displace the platen roller 15 to the non-nipping position. Thereafter, the user inserts his fingers in the finger hooking part 11C and the opening part 11D to take out the tape cassette 100 from the cassette accommodating portion 11A.

1-3. Technical Advantages of the First Embodiment

The following technical advantageous can be obtained in the printing device 1 according to the first embodiment.

(1a) The user can simultaneously visually recognize not only the printed surface of the printing tape discharged through the discharge opening 11B but also the principal surface 21 at which the input unit 12 is provided. Hence, the user can easily confirm the printing result appearing on the printing tape.

(1b) In the state where the printing device 1 is placed such that where the input unit 12 faces upward, the printing surface 14A of the printing head 14 faces downward. This configuration can restrain deposition of dust on the printing head 14 provided in the cassette accommodating portion 11A. Accordingly, malfunction in the printing head 14 is less likely to occur in the printing device 1 in which the tape cassette 100 inserted in the housing 11 is exposed to the outside thereof.

(1c) The cassette accommodating portion 11A has the opening part 11D through which a part of the tape cassette 100 attached to the cassette accommodating portion 11A can be exposed to the outside when viewed in the normal direction N of the principal surface 21. With this structure, the user can easily recognize the tape cassette 100 attached to the cassette accommodating portion 11A when the user operates the input unit 12 on the principal surface 21.

(1d) The lever 18 is provided on the rear surface 25 of the housing 11 in the printing device 1. Accordingly, a sufficient space for arrangement of the display 13 can be provided on the principal surface 21, and a suitable orientation of the printing surface 14A of the printing head 14 can be obtained.

(1e) The provision of the finger hooking part 11C can facilitate removal of the tape cassette 100 from the cassette accommodating portion 11A.

(1f) The cassette accommodating portion 11A is arranged to overlap a part of the display 13 in the normal direction N of the principal surface 21, as illustrated in FIG. 5. This structure can make the housing 11 compact.

(1g) The imaginary plane V (on which the tape cassette 100 attached to the cassette accommodating portion 11A is exposed) is designed to be slanted relative to the principal surface 21 by the angle not less than 270 degrees in the printing device 1. With this structure, entry of dust into the cassette accommodating portion 11A can be restrained. Accordingly, occurrence of malfunction in the printing head 14 can be restrained in the printing device 1 having the housing 11 to which the tape cassette 100 attached thereto is exposed to the outside.

2. SECOND EMBODIMENT

Figure 7:
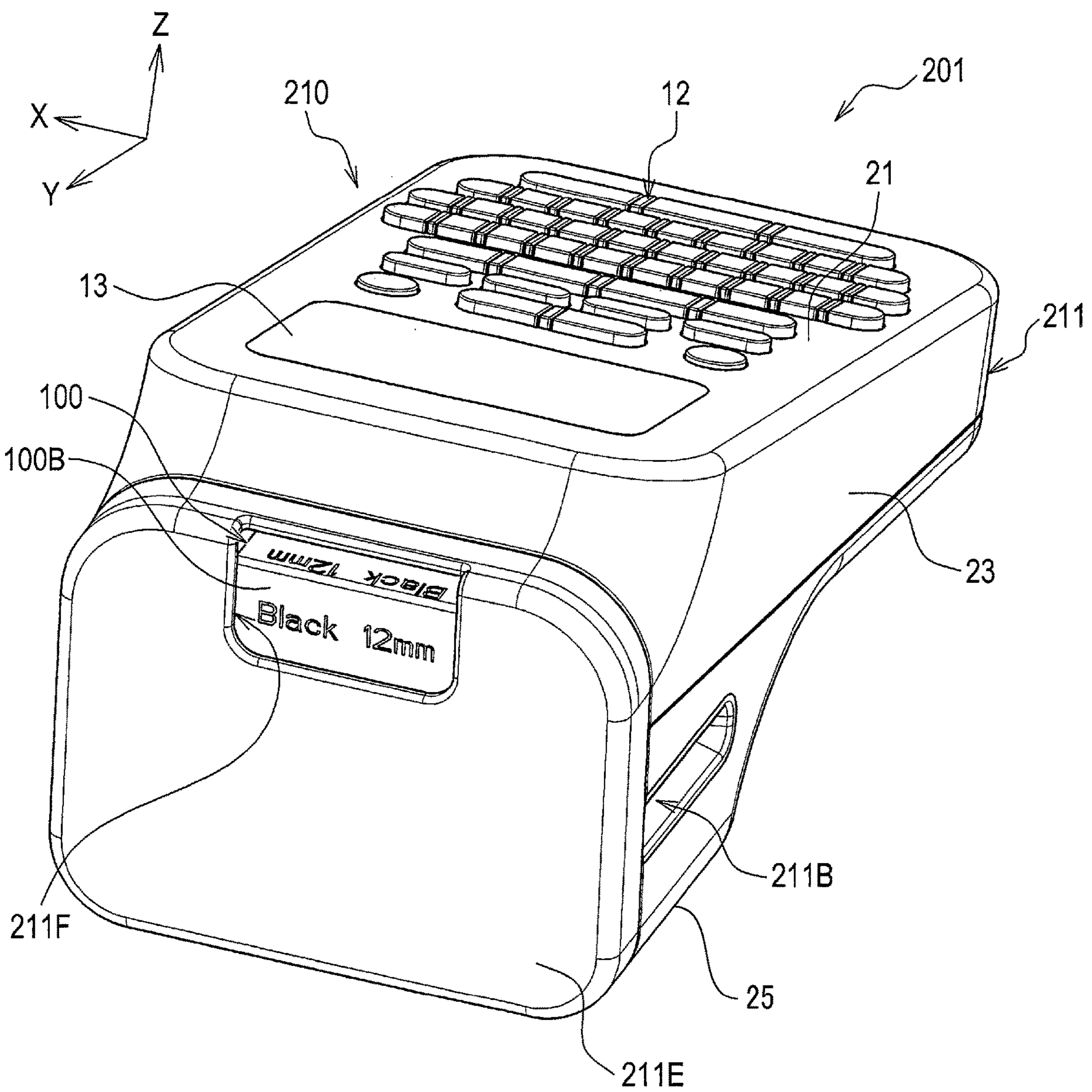
FIG. 7 is a schematic perspective view of a printing device according to a second embodiment.

A printing device 201 according to a second embodiment will next be described with reference to FIGS. 7 through 9, wherein like parts and components are designated by the same reference numerals as those of the first embodiment.

The printing device 201 includes a printer body 210 to which the tape cassette 100 is detachably attachable.

Figure 8A:
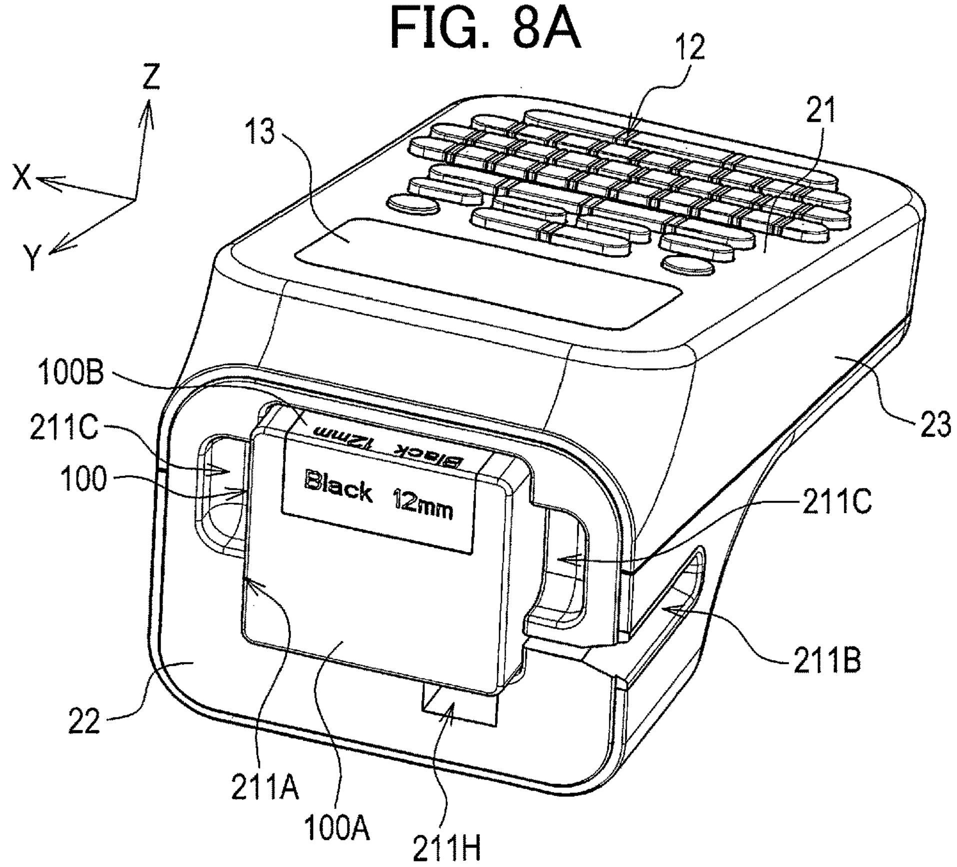
FIG. 8A is a schematic perspective view of the printing device illustrated in FIG. 7 in a state where a lid is removed and a tape cassette is attached to a cassette accommodating portion.
Figure 8B:
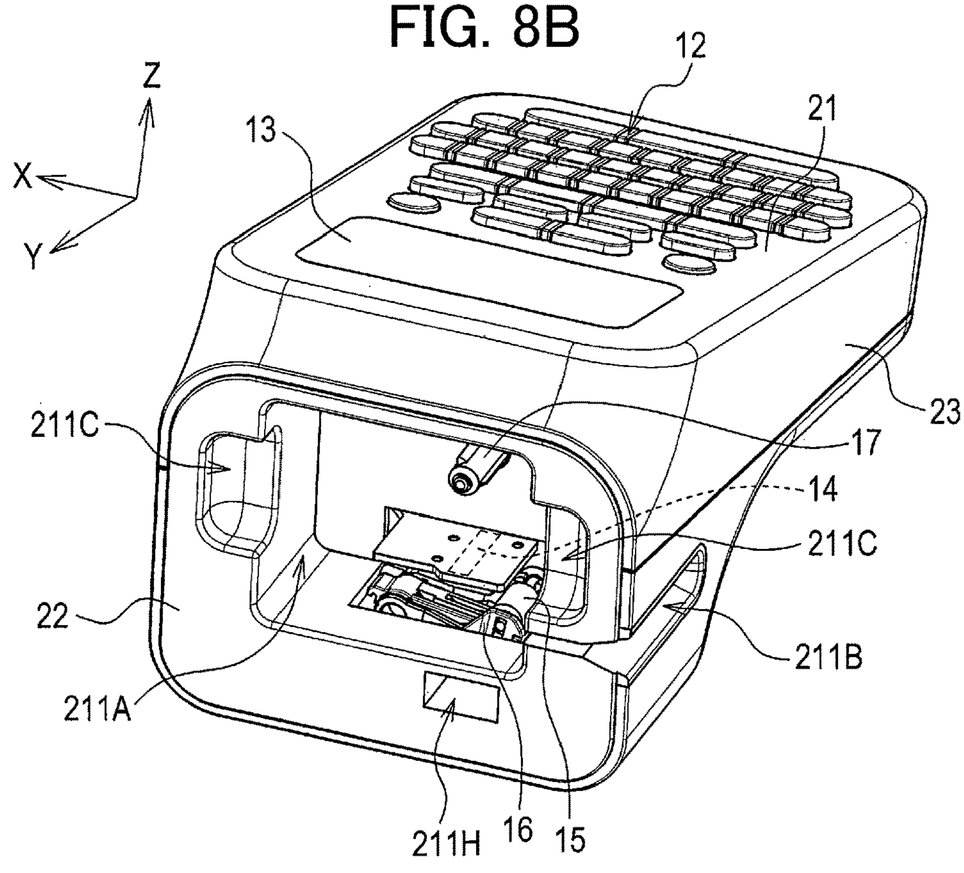
FIG. 8B is a schematic perspective view of the printing device illustrated in FIG. 7 in a state where the lid is removed and the tape cassette is detached from the cassette accommodating portion.

The printer body 210 includes a housing 211, the input unit 12, and the display 13. Further, as illustrated in FIGS. 8A and 8B, the printer body 210 includes the printing head 14, the platen roller 15, the roller holder 16, and the drive shaft 17. The printer body 210 has the same configuration as the printer body 10 of the first embodiment except the structure of the housing 211.

Specifically, the housing 211 includes a cassette accommodating portion 211A, a discharge opening 211B, a pair of finger hooking parts 211C, and a lid 211E. The cassette accommodating portion 211A is the same as the cassette accommodating portion 11A of the first embodiment, except that the cassette accommodating portion 211A does not include the opening part 11D. The discharge opening 211B has the same configuration as the discharge opening 11B of the first embodiment.

The pair of finger hooking parts 211C are recessed parts connected to the cassette accommodating portion 211A. The finger hooking parts 211C are provided respectively at two opposing side edges of the cassette accommodating portion 211A on the upper surface 22, the side edges opposing each other in the direction of the X-axis. Each finger hooking part 211C is open on the upper surface 22 and the cassette accommodating portion 211A.

Figure 9:
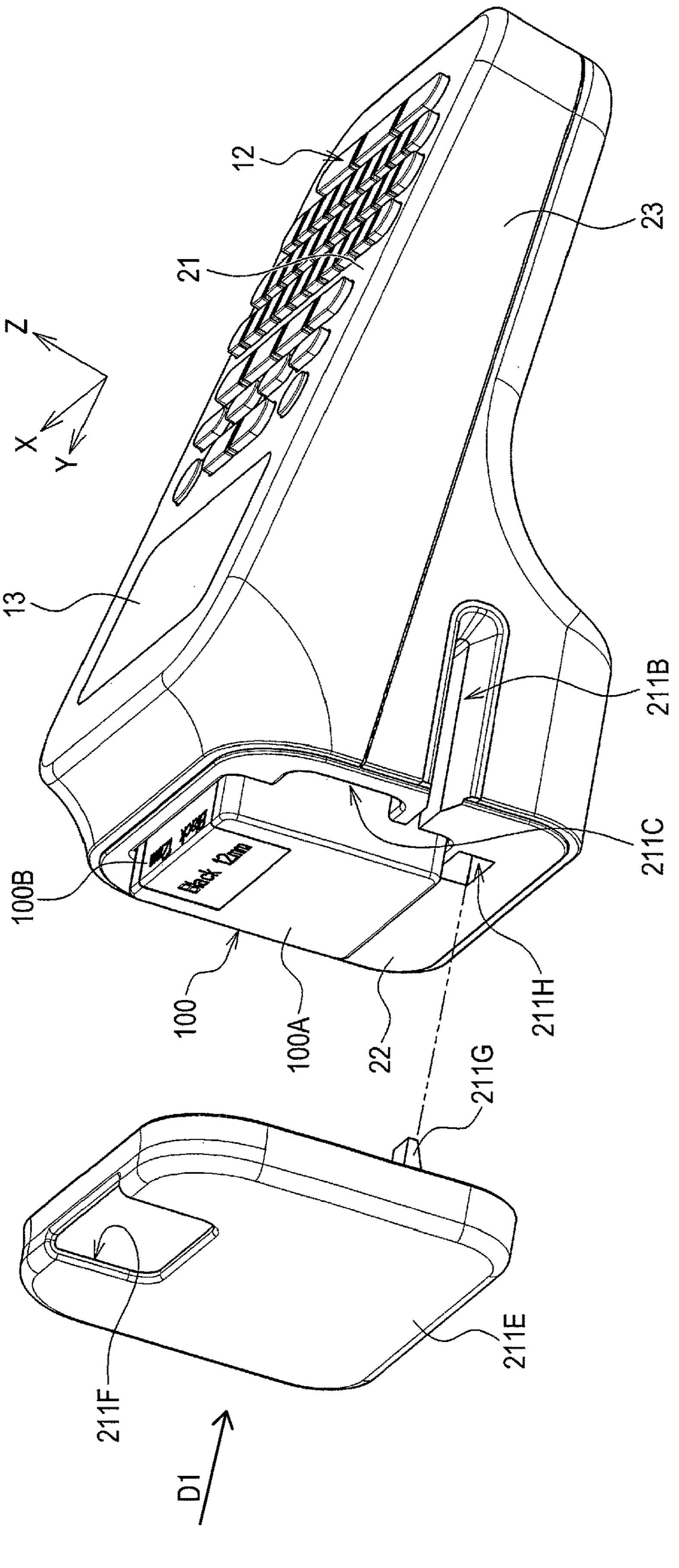
FIG. 9 is a schematic perspective view illustrating attachment of the lid in the printing device illustrated in FIG. 7.

The lid 211E illustrated in FIG. 9 is configured to cover the insertion opening of the cassette accommodating portion 211A. The lid 211E is attachable to and detachable from the upper surface 22 of the housing 211. In a state where the lid 211E is attached to the housing 211, the lid 211E covers the tape cassette 100 accommodated in the cassette accommodating portion 211A as well as the upper surface 22 of the housing 211 in the insertion direction D1 of the tape cassette 100 to the cassette accommodating portion 211A.

The lid 211E has an opening 211F and a depressing part 211G. The opening 211F functions to expose a part of the tape cassette 100 accommodated in the cassette accommodating portion 211A. Specifically, the opening 211F can expose the label 100B affixed to the tape cassette 100 attached to the cassette accommodating portion 211A, the label 100B being affixed to the outer surface 100A of the tape cassette 100 and another outer surface of the tape cassette 100 crossing the outer surface 100A.

More specifically, the opening 211F enables the part of the tape cassette 100 to be exposed to the outside when viewed not only in the normal direction N of the principal surface 21 of the housing 211 but also in the normal direction of the upper surface 22 (i.e., in the insertion direction D1 of the tape cassette 100). Hence, the user can confirm the attached tape cassette 100 when viewing the tape cassette 100 from the lid 211E side in the insertion direction D1 as well as from the input unit 12 side in the direction of the Z axis.

The depressing part 211G has a bar-like shape protruding in the insertion direction D1 of the tape cassette 100 from an inner surface of the lid 211E. Upon attachment of the lid 211E to the housing 211, the depressing part 211G is inserted in an insertion hole 211H (see FIG. 9) formed in the housing 211. The insertion hole 211H is open at the upper surface 22 and extends in the direction of the Y-axis.

The depressing part 211G inserted in the insertion hole 211H urges the roller holder 16 to move the platen roller 15 to the nipping position. That is, the lid 211E also has a function to move the platen roller 15 to the nipping position, in addition to the function to protect the attached tape cassette 100.

Figure 10:
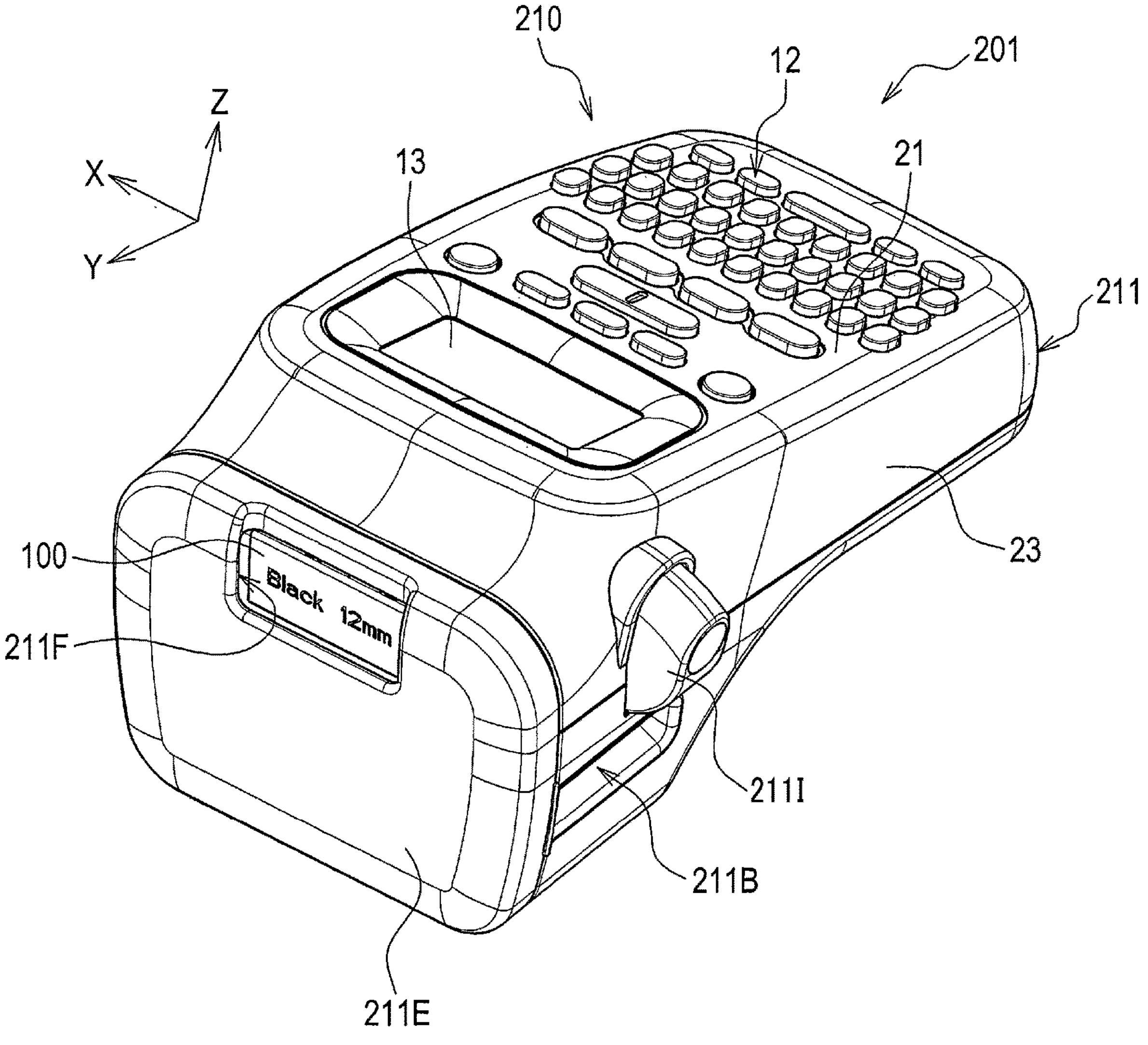
FIG. 10 is a schematic perspective view of a printing device according to a modification to the second embodiment.

Incidentally, as a variation, the printing device 201 according to the second embodiment may also include a cutter lever 2111 configured to operate a cutter (not illustrated) positioned in the housing 211, as illustrated in FIG. 10. In this variation, the cutter may be configured to move inside the housing 211 in response to the user's operation to the cutter lever 2111, thereby cutting the printing tape discharged through the discharge opening 211B.

3. MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(3a) In the printing device 1, 201 according to the first and second embodiments, the lever 18 need not be provided at the rear surface 25 of the housing 11, 211. Alternatively, the lever 18 may be provided at the principal surface 21, the first side surface 23, the second side surface 24, or the upper surface 22 of the housing 11, 211, for example.

(3b) In the printing device 1, 201 according to the first and second embodiments, the display 13 may be positioned below the input unit 12. Further, the length of the principal surface 21 in the up-down direction may be not more than the length thereof in the left-right direction.

(3c) In the printing device 1, 201 according to the first and second embodiments, the lever 18 or the depressing part 211G may be configured to displace the printing head 14, rather than the platen roller 15, between the nipping position and the non-nipping position. Still alternatively, the lever 18 or the depressing part 211G may be configured to displace both of the platen roller 15 and the printing head 14.

(3d) In the printing device 1, 201 according to the first and second embodiments, the plurality of heat-generating elements of the printing head 14 may be arranged at the same position as the first roll 101 in the scanning direction (in the insertion direction D1) in the attached state of the tape cassette 100 to the cassette accommodating portion 11A, 211A. That is, the heat-generating elements may be arranged to overlap the first roll 101 in the scanning direction (in the insertion direction D1).

(3e) In the printing device 1, 201 according to the first and second embodiments, the insertion opening of the cassette accommodating portion 11A, 211A may be positioned on the first side surface 23 or the second side surface 24 of the housing 11, 211. Further, the discharge opening 11B, 211B may be positioned on the upper surface 22 or the second side surface 24 of the housing 11, 211.

(3f) In the printing device 1 according to the first embodiment, the cassette accommodating portion 11A need not have the opening part 11D through which a part of the tape cassette 100 attached to the cassette accommodating portion 11A can be exposed to the outside.

(3g) In the above-described embodiments, a function attendant to a single part or component may be subdivided into a plurality of sub-components, and functions attendant to the plurality of parts or components may be integrated into a single component. Alternatively, a part or component in the depicted embodiments may be omitted. Still alternatively, a part or component in one of the embodiments may be added to the other embodiment, or may be replaced with a different part or component in the other embodiment.

REMARKS

The printing devices 1, 201 are examples of a printing device of the disclosure. The housings 11, 211 are examples of a housing. The cassette accommodating portions 11A, 211A are examples of a cassette accommodating portion. The insertion opening of the cassette accommodating portion is an example of an insertion opening. The tape cassette 100 is an example of a tape cassette. The insertion direction D1 is an example of an insertion direction. The printing head 14 is an example of a printing head. The input unit 12 is an example of an input unit. The principal surface 21 is an example of a principal surface of the housing. The first side surface 23 is an example of a side surface of the housing. The discharge openings 11B, 211B are examples of a discharge opening. The rear surface 25 is an example of a rear surface of the housing. The imaginary plane V is an example of an imaginary plane perpendicular to the insertion direction. The normal direction N is an example of a normal direction of the principal surface. The normal direction T is an example of a normal direction of a first surface of the printing tape. The angle φ is an example of an interior angle of less than 45 degrees. The outer surface 100A is an example of an outer surface of the tape cassette. The opening part 11D is an example of an opening part of the housing. The platen roller 15 is an example of a platen roller. The lever 18 is an example of a lever. The finger hooking parts 11C, 211C are examples of a finger hooking part. The display 13 is an example of a display. The angle θ1 is an example of an external angle of not less than 270 degrees.

What is claimed is:

1. A printing device comprising:

a housing comprising a cassette accommodating portion to which a tape cassette is detachably attachable, the cassette accommodating portion having an insertion opening through which the tape cassette is configured to be inserted into the cassette accommodating portion in an insertion direction, the tape cassette accommodating therein a roll of a printing tape;

a printing head positioned in the cassette accommodating portion and configured to perform printing on a first surface of the printing tape, the printing head comprising a plurality of heat-generating elements linearly arrayed in a scanning direction crossing an imaginary plane perpendicular to the insertion direction; and an input unit provided at the housing, wherein the insertion opening is positioned above the input unit in a state where the input unit can be operated, wherein the housing has:

a principal surface at which the input unit is provided;

a side surface crossing the principal surface and the imaginary plane; and a discharge opening formed in the side surface and configured to discharge the printing tape therethrough, and wherein, at the discharge opening, a normal direction of the first surface of the printing tape and a normal direction of the principal surface define an interior angle of less than 45 degrees therebetween.

2. The printing device according to claim 1, wherein the tape cassette has an outer surface crossing a center axis of the roll of the printing tape, and wherein the cassette accommodating portion is configured to expose the outer surface of the tape cassette to an outside of the housing upon attachment of the tape cassette to the cassette accommodating portion.

3. The printing device according to claim 1, wherein the housing further has an opening part through which a part of the tape cassette attached to the cassette accommodating portion is exposed to an outside of the housing when viewed in the normal direction of the principal surface.

4. The printing device according to claim 1, further comprising:

a platen roller positioned in the housing and configured to face the printing head; and a lever configured to move at least one of the printing head and the platen roller between a nipping position and a non-nipping position, the printing tape being nipped between the printing head and the platen roller at the nipping position, and the printing tape being separated from the at least one of the printing head and the platen roller at the non-nipping position, wherein the housing further has a rear surface positioned opposite the principal surface with respect to the printing head and the platen roller, the lever being provided at the rear surface.

5. The printing device according to claim 1, wherein the housing further has a finger hooking part connected to the cassette accommodating portion.

6. The printing device according to claim 1, wherein the principal surface has a length in an up-down direction greater than a length thereof in a left-right direction in the state where the input unit can be operated.

7. The printing device according to claim 1, wherein the input unit is a keyboard capable of inputting letters.

8. The printing device according to claim 1, further comprising a display provided at the principal surface and configured to display a content inputted through the input unit, the display being positioned closer to the insertion opening than the input unit is to the insertion opening.

9. The printing device according to claim 8, wherein the cassette accommodating portion is arranged to overlap a part of the display in the normal direction of the principal surface.

10. The printing device according to claim 1, wherein the plurality of heat-generating elements of the printing head is positioned offset from the roll of the printing tape in the scanning direction upon attachment of the tape cassette to the cassette accommodating portion.

11. A printing device comprising:

a housing comprising a cassette accommodating portion to which a tape cassette is detachably attachable, the tape cassette being configured to be inserted into the cassette accommodating portion in an insertion direction, the tape cassette accommodating therein a roll of a printing tape and having an outer surface crossing a center axis of the roll of the printing tape;

a printing head positioned in the cassette accommodating portion and configured to perform printing on the printing tape, the printing head comprising a plurality of heat-generating elements linearly arrayed in a scanning direction crossing an imaginary plane perpendicular to the insertion direction, the plurality of heat-generating elements constituting a printing surface of the printing head; and an input unit provided at the housing, wherein the housing is configured to expose the outer surface of the tape cassette upon attachment of the tape cassette to the cassette accommodating portion, and wherein the printing surface of the printing head faces downward in a state where the housing is placed on a horizontal surface such that the input unit faces upward.

12. The printing device according to claim 11, wherein the housing has:

a principal surface at which the input unit is provided;

a side surface crossing the principal surface and the imaginary plane; and a discharge opening formed in the side surface and configured to discharge the printing tape therethrough.

13. The printing device according to claim 11, wherein the housing has:

a principal surface at which the input unit is provided; and an opening part through which a part of the tape cassette attached to the cassette accommodating portion is exposed to an outside of the housing when viewed in a normal direction of the principal surface.

14. The printing device according to claim 11, further comprising:

a platen roller positioned in the housing and configured to face the printing head; and a lever configured to move at least one of the printing head and the platen roller between a nipping position and a non-nipping position, the printing tape being nipped between the printing head and the platen roller at the nipping position, and the printing tape being separated from the at least one of the printing head and the platen roller at the non-nipping position, wherein the housing has:

a principal surface at which the input unit is provided; and a rear surface positioned opposite the principal surface with respect to the printing head and the platen roller, the lever being provided at the rear surface.

15. The printing device according to claim 11, wherein the housing has a finger hooking part connected to the cassette accommodating portion.

16. The printing device according to claim 11, wherein the housing has a principal surface at which the input unit is provided, the principal surface having a length in an up-down direction greater than a length thereof in a left-right direction in the state where the housing is placed on the horizontal surface such that the input unit faces upward.

17. The printing device according to claim 11, wherein the input unit is a keyboard capable of inputting letters.

18. The printing device according to claim 11, further comprising a display configured to display a content inputted through the input unit, wherein the housing has a principal surface at which the input unit and the display are provided, and wherein the cassette accommodating portion has an insertion opening through which the tape cassette is configured to be inserted in the cassette accommodating portion, the display being positioned closer to the insertion opening than the input unit is to the insertion opening.

19. The printing device according to claim 18, wherein the cassette accommodating portion is arranged to overlap a part of the display in a normal direction of the principal surface.

20. The printing device according to claim 11, wherein the plurality of heat-generating elements of the printing head is positioned offset from the roll of the printing tape in the scanning direction upon attachment of the tape cassette to the cassette accommodating portion.

21. A printing device comprising:

a housing comprising a cassette accommodating portion to which a tape cassette is detachably attachable in an insertion direction, the tape cassette accommodating therein a roll of a printing tape and having an outer surface crossing a center axis of the roll of the printing tape;

a printing head positioned in the cassette accommodating portion and configured to perform printing on the printing tape, the printing head comprising a plurality of heat-generating elements linearly arrayed in a scanning direction crossing an imaginary plane perpendicular to the insertion direction; and an input unit provided at a principal surface of the housing, the principal surface and the imaginary plane defining therebetween an external angle greater than 270 degrees at an outside of the housing.

* * * * *